UNITED STATES PATENT OFFICE.

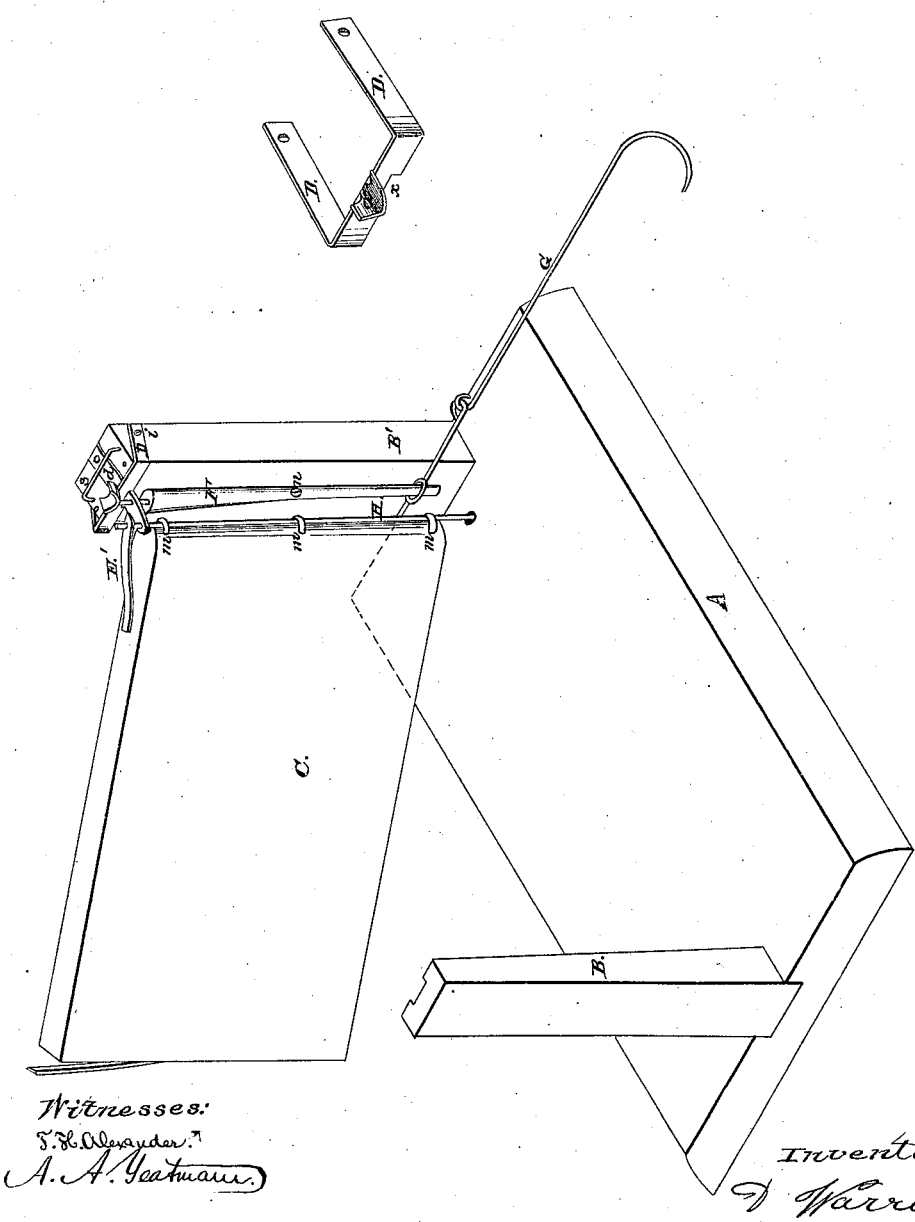

D. WARREN, OF GETTYSBURG, PENNSYLVANIA.

METHOD OF OPENING AND CLOSING FARM-GATES.

Specification of Letters Patent No. 24,513, dated June 21, 1859.

*To all whom it may concern:*

Be it known that I, DAVID WARREN, of Gettysburg, in the county of Adams and State of Pennsylvania, have invented certain new and useful Improvements in Farm-Gates; and I do hereby declare that the following is a full, clear, and exact description of the same, reference being had to the accompanying drawings and to the letters of reference marked thereon.

The nature of my invention consists in constructing a farm gate substantially in the manner hereinafter described.

In the annexed drawings Figure 1 is a perspective view of the gate. Fig. 2 is a perspective view of a falling catch attached to one of the gate posts.

In the figures A represents a platform on which is erected two posts B, B', B' being the post to which the gate is hung.

C represents the gate.

H represents a rod the lower end of which sets in the platform A. Said rod stands in a perpendicular position and passes through loops m, m, m, which are firmly secured to the gate, its upper end passing through a hole in the end of a bar d, which is pivoted on top of the gate post B', and through a bar which is firmly secured at the rear end of the top of the gate.

F', represents a lever which is pivoted to the post B' at n, as is shown in Fig. 1. The upper end of this lever is provided with a pin which passes through the bar d. To the lower end of lever F', a rod G is attached which extends along the road on both sides of the gate to any convenient distance.

D, represents a falling catch the form and construction of which will be seen in Fig. 2. This catch is provided with a slot as seen at x, Fig. 2, and just above that slot with a curved piece marked a, which has its convexity downward. This catch D, is pivoted to the post B' near its top as will be seen in such a manner that it will drop of its own gravity when desired.

S represents a staple driven in the top of the post B' over the bar d, to prevent it from moving too far to one side or the other or to keep it from coming off of the post.

In operating this gate it is intended that the wheels of a wagon or vehicle, of any kind should run over a crank placed on the ground at a convenient distance from the gate to which the rod G, is attached. When the vehicle draws upon the rod G by passing over the crank, the lower end of the lever F, is operated in one direction and the upper end is operated in contrary direction. When the upper end of the lever moves it throws the bar d to one side and consequently the upper part of the gate out of a vertical line with the bottom, which causes the gate to swing around, and to stand in this position open until the gate is again operated upon. The vehicle in approaching the gate operates upon it in such a manner as that it will open from the said vehicle and as it passes through it operates upon it so as to throw the top part of the gate in a vertical line with the bottom which causes it to change its position and shut, but it has been ascertained that when the gate is thrown back in the position just spoken of it will not remain in that position until the gate swings to. But it will be seen in my arrangement, that when the gate is thrown in a vertical position by the wheels of the vehicle, the falling catch D will drop and hold the gate in that position until it swings around with its front to the post B. As its front approaches the post B, the bar E on top of the gate comes in contact with the curved piece a, on the catch D, and when the gate catches, the said bar E raises the catch D, so that it will not clasp or hold the bar d, in its groove x, and thus when a vehicle approaches the gate again it is ready for action.

I can vary the mode of raising the catch D, as I may place a long bar on top of the gate, which will be operated upon by the spring which holds the front part of the gate to the post B. When this spring is pushed back it may operate the bar spoken of, and cause it to pass under the curved piece a, as a wedge, and thus throw the catch up.

Having thus fully described my invention what I claim as new and desire to secure by Letters Patent is—

The arrangement of the lever F, and bar d, with the bar E and falling catch D, as constructed substantially in the manner and for the purpose herein fully described.

D. WARREN.

Witnesses:
C. M. ALEXANDER,
T. H. ALEXANDER.